United States Patent
Cummings et al.

(10) Patent No.: US 8,678,058 B2
(45) Date of Patent: *Mar. 25, 2014

(54) STANDING SEAM PROFILE FIELD WELDING DEVICE AND METHOD

(75) Inventors: Harley F. Cummings, Clinton, OH (US); Sudhir Railkar, Wayne, NJ (US)

(73) Assignee: Building Materials Investment Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 13/470,254

(22) Filed: May 11, 2012

(65) Prior Publication Data

US 2012/0222811 A1    Sep. 6, 2012

Related U.S. Application Data

(62) Division of application No. 12/651,331, filed on Dec. 31, 2009, now Pat. No. 8,381,450.

(51) Int. Cl.
*B32B 37/00*    (2006.01)

(52) U.S. Cl.
USPC ......................... 156/391; 156/497; 156/499

(58) Field of Classification Search
USPC .......... 156/391, 497, 499, 544, 553, 574, 579
See application file for complete search history.

(56) References Cited

U.S. PATENT DOCUMENTS

| | | | |
|---|---|---|---|
| 2,178,507 A | 10/1939 | Williams | |
| 2,348,658 A | 5/1944 | Slaughter | |
| 2,388,297 A | 11/1945 | Slaughter | |
| 2,705,820 A | 4/1955 | Torrence | |
| 3,213,584 A | 10/1965 | Bush | |
| 3,760,544 A | 9/1973 | Hawes et al. | |
| 4,333,295 A | 6/1982 | Janke | |
| 4,368,095 A * | 1/1983 | Gross et al. | 156/497 |
| 4,402,168 A | 9/1983 | Maier, Jr. | |
| 4,599,684 A | 7/1986 | Lee | |
| 4,658,559 A | 4/1987 | Doherty | |
| 4,913,576 A | 4/1990 | Grant, Jr. | |
| 5,058,297 A | 10/1991 | McGinnis | |
| 5,322,724 A | 6/1994 | Levens | |
| 5,596,858 A | 1/1997 | Jordan | |
| 5,655,346 A | 8/1997 | Holmes et al. | |
| 5,771,652 A | 6/1998 | Nagata et al. | |
| 6,158,915 A | 12/2000 | Kise | |
| 6,164,024 A | 12/2000 | Konstantin | |
| 6,173,547 B1 | 1/2001 | Lipson | |
| 6,219,982 B1 | 4/2001 | Eyring | |
| 6,230,461 B1 | 5/2001 | Piront | |
| 6,318,047 B1 | 11/2001 | Richardson | |
| 6,405,504 B1 | 6/2002 | Richardson | |
| 6,505,455 B1 | 1/2003 | Georgeau | |
| 6,554,947 B2 | 4/2003 | Pfotenhauer et al. | |
| 6,581,663 B2 * | 6/2003 | Rubenacker et al. | 156/391 |
| 6,826,883 B2 | 12/2004 | Guzman et al. | |
| 6,997,800 B1 | 2/2006 | Kohler | |

(Continued)

OTHER PUBLICATIONS

PCT|US10/62422, Search Report and Written Opinion of International Searching Authority mailed Apr. 19, 2011.

*Primary Examiner* — James Sells
(74) *Attorney, Agent, or Firm* — Baker & McKenzie LLP

(57) ABSTRACT

This invention relates to a novel thermoplastic profile roofing strip and an apparatus for welding the thermoplastic profile roofing strip to a thermoplastic roofing membrane.

7 Claims, 4 Drawing Sheets

(56) References Cited

U.S. PATENT DOCUMENTS

| | | |
|---|---|---|
| 7,107,727 B2 | 9/2006 | Nelsen |
| 7,441,379 B2 | 10/2008 | Konstantin |
| 7,608,316 B2 | 10/2009 | Okajima et al. |
| 8,313,597 B2 * | 11/2012 | Yang et al. ............. 156/82 |
| 2006/0151107 A1 | 7/2006 | Peterson |

* cited by examiner

STANDING SEAM PROFILE FIELD WELDING DEVICE AND METHOD

CROSS-REFERENCES TO RELATED APPLICATION

The present application claims priority to and is a divisional application of U.S. patent application Ser. No. 12/651,331 entitled "Standing seam profile field welding device and method" filed Dec. 31, 2009, now issued as U.S. Pat. No. 8,381,450, which is incorporated by reference in its entirety as if set forth in full.

TECHNICAL FIELD

This invention relates to an improved device and method for welding decorative profiles to thermoplastic roofing membranes, more particularly welding a thermoplastic decorative profile to a thermoplastic single ply membrane.

BACKGROUND

Thermoplastic roofing membranes, such as polyvinyl chloride (PVC) and thermoplastic polyolefin (TPO), are rapidly growing in market acceptance. However, even though they can be made in a wide variety of colors, they do not impart a good aesthetic appearance to a roof surface. In contrast, metal roofing has regular, parallel standing seams that join each sheet of metal. These seams, together with colored metal coatings, provide for an attractive roofing surface. In fact, metal roofing is frequently used as a decorative and functional roof surface for small commercial and public building roof sections that are visible from the street. Some plastic profile systems are available for attachment to thermoplastic roofing membranes, such that a metal roof like appearance can be obtained. These profile systems are sometimes described as standing seam profiles (SSP).

To duplicate this appearance, thermoplastic strips have been secured to the thermoplastic membranes, sometimes by adhesive, and sometimes by the application of heat, all of which is done manually. An example of an adhesive system is a butyl peel and stick tape. Adhesive systems require the roof membrane be primed prior to attachment, with difficulty being priming the exact area of attachment. Primer that extends onto the roofing membrane from under the strips may be visible and discolor the membrane. Another disadvantage of adhesively attached profiles is that adhesive systems may not be as robust for the 20 to 30 year life expectancy of the roof system as compared to a permanent attachment method.

Applying heat to permanently attach the profiles may require a welder that is large and cumbersome. For a steep sloped roof, this is especially challenging. Also, the roofer will be required to guide the system in a straight line to achieve a good appearance, while keeping the profile in place, and maintaining a balance on a sloped roof.

Unfortunately, manual application of the strips is a time consuming and labor intensive process, increasing the cost of the roofing and decreasing the cost advantage gained by selecting thermoplastic roofing over metal roofing. Manual application also increases opportunity for error and is not conducive to creating straight and/or parallel and/or equidistant lines. What is needed in the art is a quick and inexpensive apparatus and method of attaching thermoplastic strips to thermoplastic roofing membranes.

SUMMARY

Embodiments disclosed herein provide for a thermoplastic profile strip and a welding apparatus for permanently attaching the profile strip to a thermoplastic roofing material, as well as a related method of welding the profile strip t the roofing material.

In one embodiment, a method of welding a thermoplastic profile strip to a thermoplastic membrane is disclosed, where the method comprises placing a thermoplastic profile strip on a thermoplastic membrane. The profile strip has a horizontal base extending longitudinally, and a first raised lip along one longitudinal edge and a second raised lip along a second longitudinal edge opposite the first edge, the first and second lips being bent substantially equal. The method also comprises directing hot air above and below a portion of the first raised longitudinal lip, and directing hot air above and below a portion of the second raised longitudinal lip simultaneously with the hot air directed above and below the portion of the first raised lip. When employing such a method, the hot air above and below the portions of the first and second raised lips sufficiently softens the portions of the first and second lips such that gravity brings the portions of the first and second lips into contact with the membrane thereby heat-welding the portions of the first and second lips to the membrane. In addition, the method comprises advancing the hot air along the remaining length of the first and second raised lips until the entire length of the first and second lips contacts the membrane.

In another aspect, an apparatus for welding a thermoplastic profile strip to a thermoplastic membrane is provided. In one embodiment, the apparatus comprises a first nozzle configured to direct hot air above and below a first raised longitudinal lip along a first edge of a horizontal base of a thermoplastic profile strip placed on a thermoplastic membrane. The apparatus may also comprise a second nozzle configured to direct hot air above and below a second raised longitudinal lip along a second, opposing edge of the thermoplastic profile strip. Still further, such an embodiment of the apparatus may comprise a tubular splitter configured to simultaneously supply hot air to the first nozzle and the second nozzle.

In yet another aspect, a thermoplastic profile roofing strip is provided. IN one embodiment, the strip comprises a horizontal base extending longitudinally and having a first upward bend along one longitudinal edge and a second upward bend along a second longitudinal edge opposite the first edge. In some embodiments, the first upward bend and the second upward bend are substantially equal and symmetrical to one another. In addition, the profile strip may comprise a vertical central portion laterally connected to an upper surface of the horizontal base and having a hook along an upper longitudinal edge of the vertical central portion. In such embodiments, the vertical central portion extends longitudinally along the horizontal base. In addition, the hook of the vertical central portion may extend partially horizontal from the upper longitudinal edge and partially downward therefrom.

DETAILED DESCRIPTION

Figure 1:
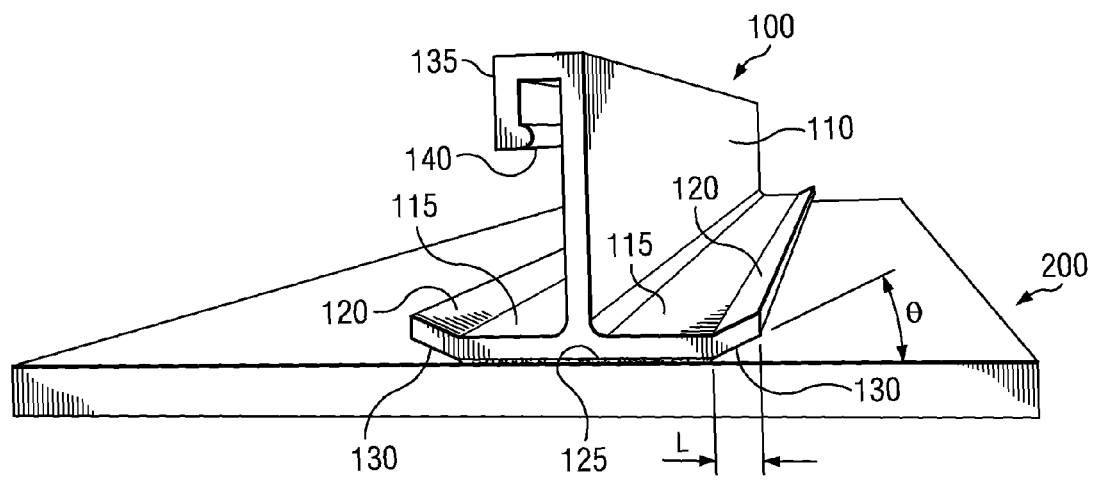
FIG. 1 is a cross-sectional view of a thermoplastic profile strip to be welded to a thermoplastic roofing membrane.
Figure 2:
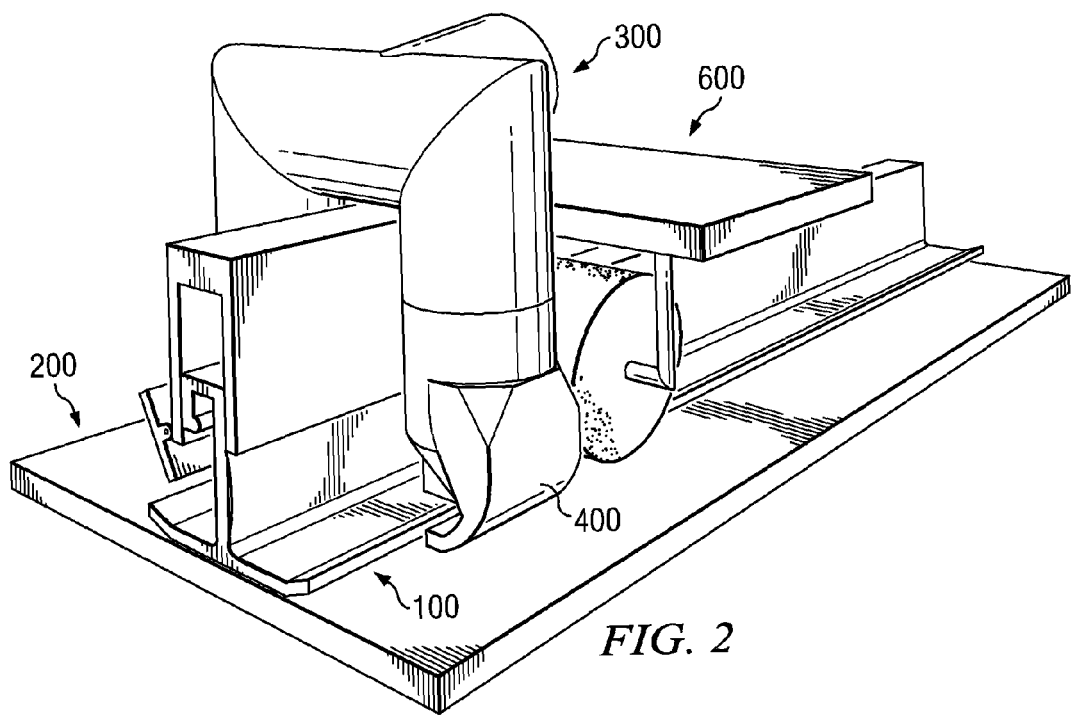
FIG. 2 is a schematic view of an embodiment of a welding apparatus for attaching a thermoplastic profile strip to a thermoplastic roofing membrane.

Embodiments in accordance with the disclosed principles provide a thermoplastic profile strip 100 as shown in FIG. 1 to be attached to a thermoplastic roofing membrane 200. The thermoplastic profile strip 100 is preferably produced as an integrally formed seamless thermoplastic object. Methods of production of the thermoplastic profile strip 100 may include, but are not limited to, extrusion, molding, die cutting, pressure forming, and those known to those skilled in the art. The thermoplastic profile strip 100 preferably includes an upstanding central portion 110 extending lengthwise along the strip, and opposed flange portions 115 extending widthwise from the central portion 110. In some embodiments, the opposed flange portions 115 may be a combination of vertical legs forming a shape. In yet other embodiments, the cross section of the upstanding central portion 110 may be any shape known to one skilled in the art, and which can be used with the apparatus 300 described below. In some embodiments, the upstanding central portion 110 may extend from about ½ inch to about 1 inch. The opposed flange portions 115 further include a lip 120 on either or both, and having a length L and an angle θ. In a preferred embodiment, L is about ¼ inch and θ is about 30 degrees. In alternate embodiments, L may range from about ⅛ inch to about 1 inch with θ ranging from about 15 degrees to about 60 degrees. Of course, any advantageous measurements may also be employed.

Opposite the upstanding central portion 110 and the opposed flange portions 115 is a bottom surface 125. In a preferred embodiment, the bottom surface 125 is about 1½ inches. In alternate embodiments, the bottom surface 125 may range from about ½ inch to about 3 inches. Opposite the lips 120 are a lip bottom surface 130. In some embodiments, the lip bottom surface 130 ranges from about ⅛ inch to about 1 inch In some embodiments, the bottom surface 125 may be coated with an adhesive. In some embodiments, the bottom surface 125 may be coated with a pressure sensitive adhesive and a release liner. In some embodiments, the coating may also act as sealant.

The upper portion of the upstanding central portion 110 includes an integral hook 135. In a preferred embodiment, the hook 135 has a cross section similar to an upside down U. In an alternate embodiment, the hook 135 may also include a lip 140. In alternate embodiments, the hook 135 may be any cross sectional shape capable of being a guide or used with a lock as described below. In alternate embodiments, the cross sectional profile of the thermoplastic profile strip 100 may be a variety of shapes.

Embodiments of an apparatus 300 for welding the thermoplastic profile strip 100 to the thermoplastic roofing membrane 200 are shown in FIGS. 2-6. Like numerals are used across the figures to describe similar parts of the apparatus 300. In a preferred embodiment, the apparatus 300 includes a first nozzle 400, a second nozzle 500, and a platform guiding device 600.

Figure 3A:
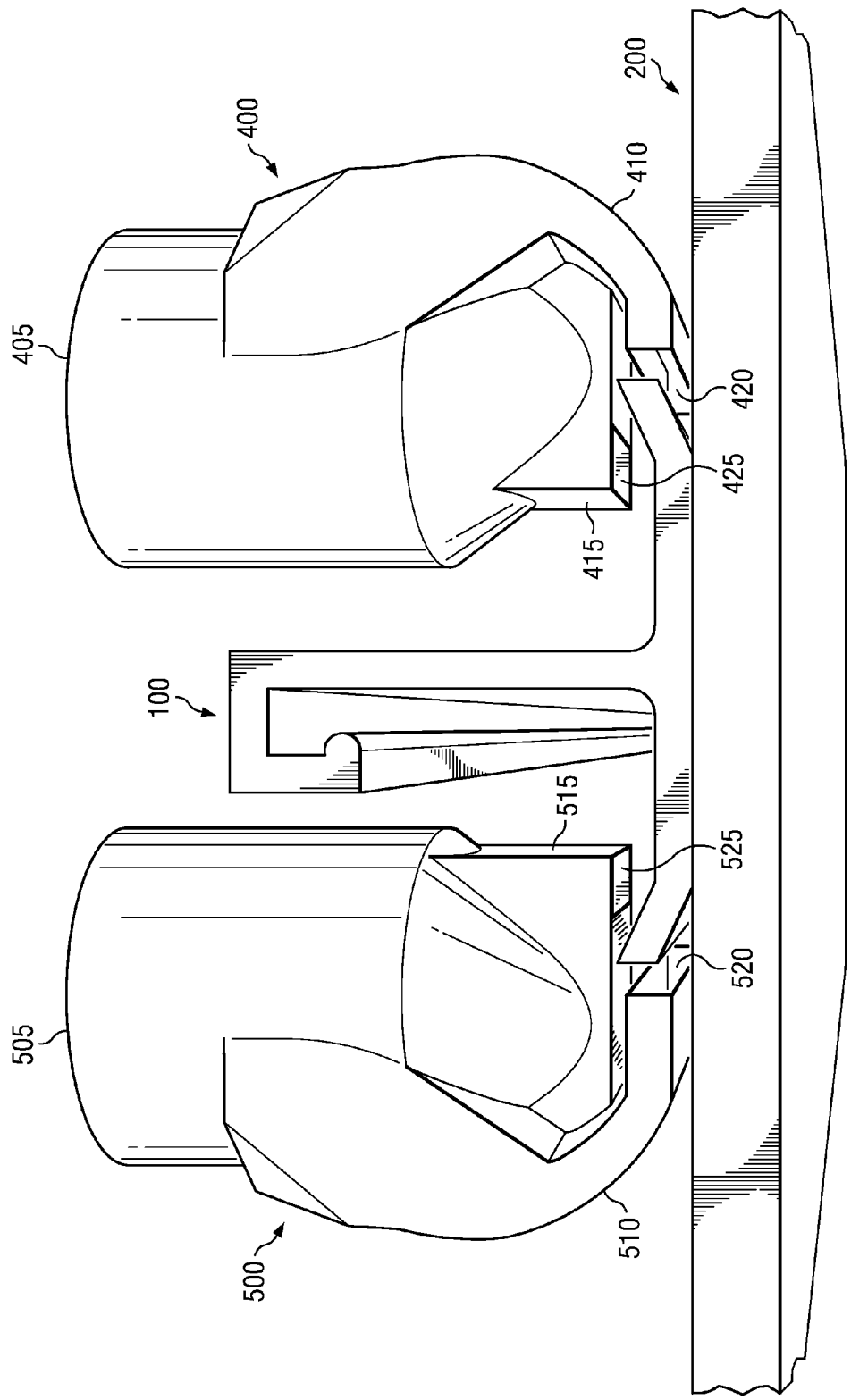
FIG. 3A is a detailed view of an embodiment of nozzle tips for use with the welding apparatus of FIG. 2.
Figure 3B:
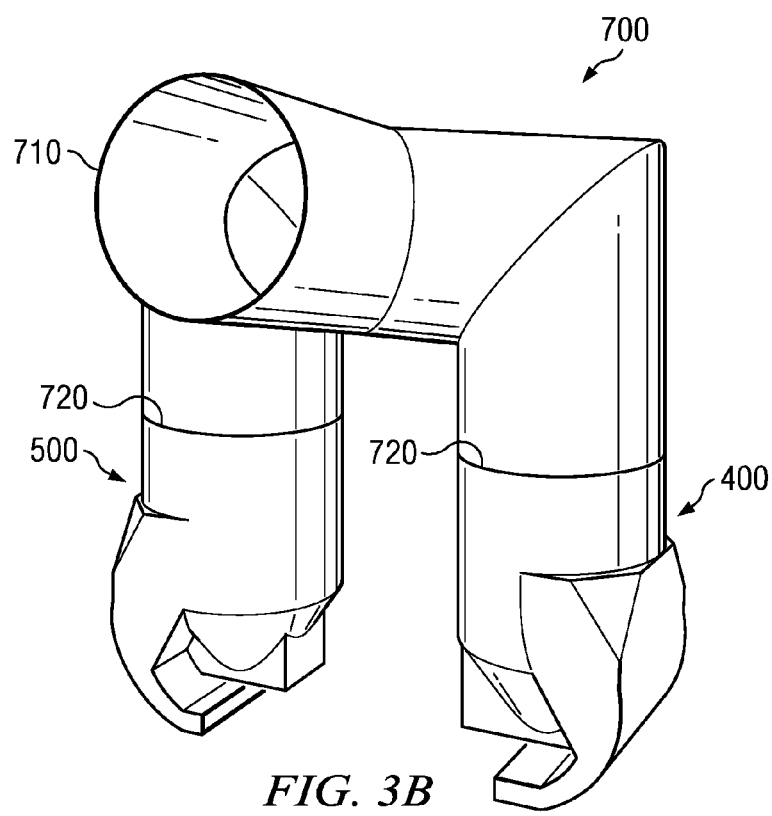
FIG. 3B is a detailed view of an embodiment of the nozzle tips of FIG. 3A conjoined for use with the welding apparatus of FIG. 2.

FIG. 3A is an enlarged view of the first nozzle 400 and the second nozzle 500, and their relation to the thermoplastic profile strip 100 and the thermoplastic roofing membrane 200. FIG. 3B is an enlarged view of a splitter 700 connected to the first nozzle 400 and the second nozzle 500. The splitter 700 supplies hot air to the first nozzle 400 and the second nozzle 500. The splitter 700 includes an inlet 710 and a plurality of outlets 720. In a preferred embodiment, the splitter 700 is fabricated from pipe components, i.e., ducting, clamps, fittings, etc. In an alternate embodiment, the splitter 700 is an integrally fabricated piping component. The sizing of the splitter 700, including the inlet 710 and the plurality of outlets 720, may be dependent on the sizing of the first nozzle 400 and the second nozzle 500, which is typically sized dependent on the thermoplastic profile strip 100. The splitter 700 will be connected to a hot air supply (not shown), preferably a hot air gun.

The first nozzle 400 includes an inlet 405, a first tip 410 and a second tip 415. The inlet 405 will be connected to one of the outlets 720 of the splitter. The first tip 410 includes an outlet 420 for delivering a hot air stream to the lip bottom surface 130. The cross section of the first tip 410 is preferably shaped to provide an even flow of hot air. In a preferred embodiment, the cross section of the first tip 410 is rectangular. The second tip 415 includes an outlet 425 for delivering a hot air stream to the junction of the opposed flange portion 115 and the lip 120. The cross section of the second tip 415 is preferably shaped to provide an even flow of hot air. In a preferred embodiment, the cross section of the second tip 415 is rectangular.

The second nozzle 500 includes an inlet 505, a first tip 510 and a second tip 515. The inlet 505 will be connected to one of the outlets 720 of the splitter. The first tip 510 includes an outlet 520 for delivering a hot air stream to the lip bottom surface 130. The cross section of the first tip 510 is preferably shaped to provide an even flow of hot air. In a preferred embodiment, the cross section of the first tip 510 is rectangular. The second tip 515 includes an outlet 525 for delivering a hot air stream to the junction of the opposed flange portion 115 and the lip 120. The cross section of the second tip 515 is preferably shaped to provide an even flow of hot air. In a preferred embodiment, the cross section of the second tip 515 is also rectangular.

As is illustrated, the first nozzle 400 and the second nozzle 500 may be slightly different. The second nozzle 500 may be sized to accommodate the hook 135 of the thermoplastic profile strip 100. The shape and size of the splitter 700, first nozzle 400, second nozzle 500 and the associated parts may be designed by one of skill in the art to be provide hot air to both the junction of the opposed flange portion 115 and the lip 120 and the lip bottom surface 130 simultaneously. In alternate embodiments, the first nozzle 400 and the second nozzle 500 may be identical or symmetrical depending on the cross section of the thermoplastic profile 100.

Figure 4:
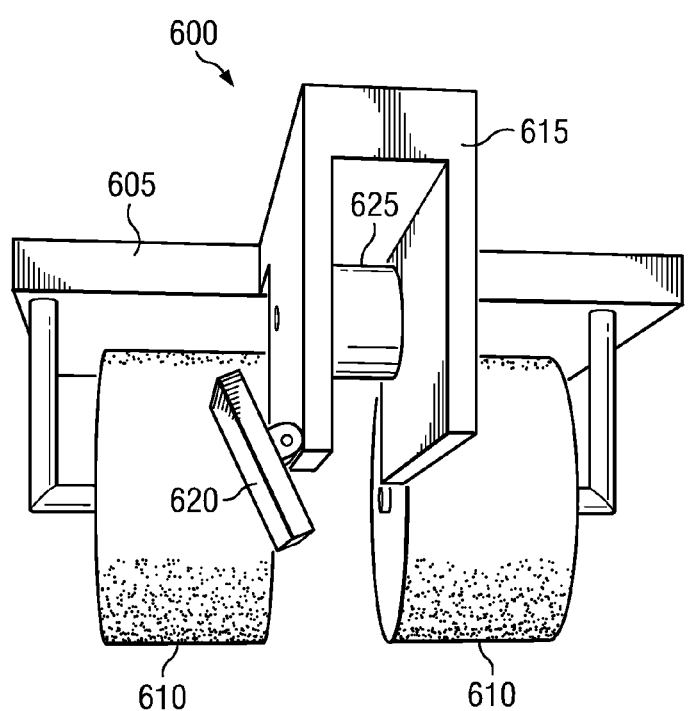
FIG. 4 is a detailed view of an embodiment of a platform and guiding device for use with the welding apparatus of FIG. 2.

As shown in FIG. 4, the platform guiding device 600 is capable of moving the splitter 700, first nozzle 400, and second nozzle 500 along the length of the upstanding central portion 110 of the thermoplastic profile strip 100. In some embodiments, the platform guiding device 600 may be self-propelled, while in other embodiments the platform guiding device 600 may be manually propelled by an operator. In a preferred embodiment, the platform guiding device 600 includes a platform 605, one or more rollers 610, a guide 615, and a locking device 620. In a preferred embodiment, the platform 605 is capable of supporting the hot air supply and associated parts. The platform 605 may be shaped and sized by one of skill in the art to support the one or more rollers 610, the guide 615, the locking device 620, and associated parts.

One or more rollers 610 are preferably sized to provide pressure to opposed flange portions 110 and the lips 130 to weld the thermoplastic profile strip 100 to the thermoplastic roofing membrane. More specifically, the rollers 610 apply downward pressure on the flange portions 110 and the lips 130, while the pressed area is heated with hot air. In a preferred embodiment, the rollers 610 are made of silicon. In alternate embodiments, the rollers 610 may be made of metal, coated metal, or other advantageous materials.

Figure 5:
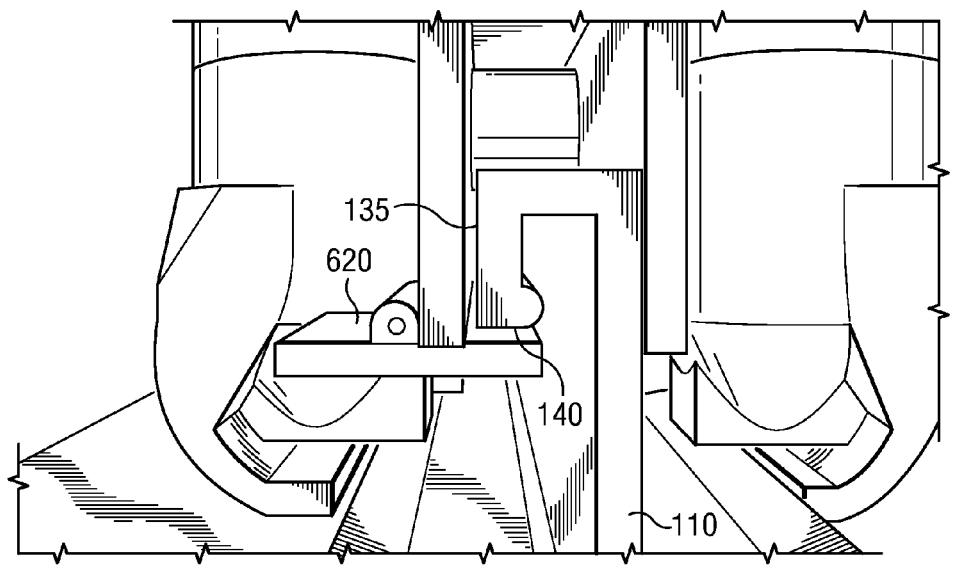
FIG. 5 is a detailed view of an embodiment of a guide lock for use with the welding apparatus of FIG. 2.

To ensure the hot air and pressure are applied to the welding area, the guide 615 travels along the upstanding central portion 110 of the thermoplastic profile strip 100. In a preferred embodiment, the guide 615 is an upside down U in cross section, sized to be placed over the hook 135 of the thermoplastic profile strip 100. The guide 615 may also include a guide roller 625. In some embodiments, the guide roller 625 is sized to control the elevation of the platform guiding device 600. In some embodiments, the guide roller 625 is a silicon roller. In alternate embodiments, the guide roller 625 may be made of metal, coated metal, or other advantageous materials. In some embodiments, the guide roller 625 may also include electrical sensors, electrical controllers or combinations thereof to assist in guiding the guiding device 600 during use. In some embodiments, the guide 615 also includes the locking device 620. The locking device 620 is shaped and sized to connect with the hook 135 of the thermoplastic profile strip 100. In some embodiments, the locking device 620 is a movable platform having a first position for providing access to place the guide 615 on the upstanding central portion 110, and a second position to place the movable platform in contact with the hook 135 of the thermoplastic profile strip 100. FIG. 5 shows the locking device 620 in position to begin welding.

Figure 6:
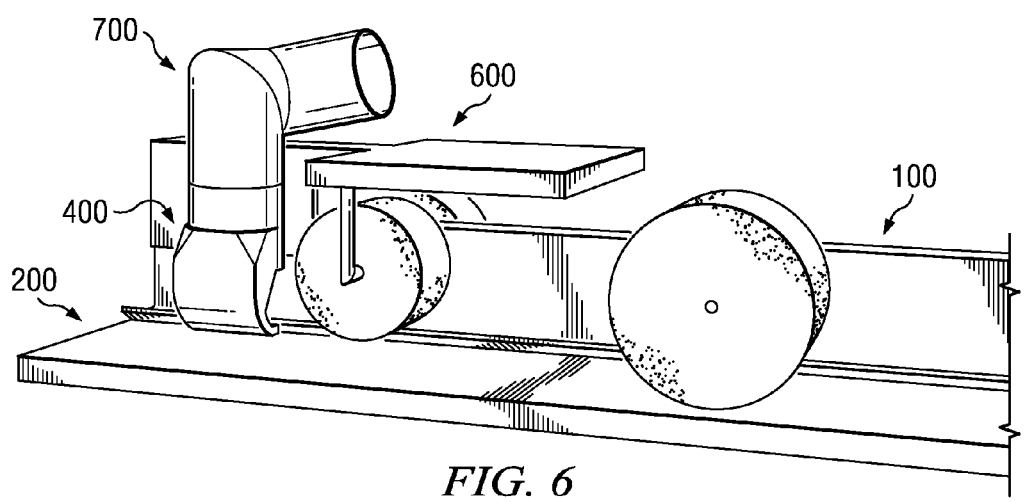
FIG. 6 is a detailed view of an embodiment of a welding apparatus constructed in accordance with the disclosed principles.

FIG. 6 provides an embodiment of the apparatus 300 in use for welding the thermoplastic profile strip 100 to the thermoplastic roofing membrane 200. Before the thermoplastic profile strip 100 is welded to the thermoplastic roofing membrane 200, the thermoplastic profile strip 100 may be temporarily attached to the thermoplastic roofing membrane 200 in straight parallel lines using an adhesive. However, such an adhesive is not required. In operation, the first nozzle 400 and the second nozzle are positioned as shown in FIG. 3A. As the platform guiding device 600 moves along the upstanding central portion 110 of the thermoplastic profile strip 100, jets of hot air from the first nozzle 400 and the second nozzle 500 are directed under the lips 120, heating the lip underside 130 and the area of the thermoplastic membrane 200 just below the lips 120. The hot air also makes the lips 120 flexible. The lip bottom surface 130 is welded to the thermoplastic roofing membrane 200 once the hot air sufficiently heats the lips 130 and the membrane 200. Immediately after the hot air welds, the rollers 610 press the lip 120 and therefore the lip bottom surface 130 against the thermoplastic roofing membrane 200 to secure the thermoplastic profile strip 100 to the thermoplastic roofing membrane 200. The apparatus 300 is then rolled along the length of the strip 100, welding the entire lengths of the lips 130 to the membrane 200 in the process.

The rate of movement of the apparatus 300 may be adjusted depending on the temperature of the hot air provided by the nozzles 400, 500. In embodiments where the apparatus 300 is self-propelled, an adjustment may be provided for the temperature of the hot air, the rate of movement of the apparatus 300 along the strip 100, or both. Moreover, the adjustment may be designed such that user adjustment of one parameter automatically adjusts the other. For example, if a very high temperature is used for the hot air, the rate of the movement of the apparatus 300 may consequently be increased to compensate for the increase in temperature. Additionally, different thicknesses of membranes 200 and/or lips 130 of the strips 100, as well as the specific materials comprising each of these components, may also require adjustment of one or both of the hot air temperature and the rate of movement of the apparatus 300. Still further, the apparatus 300 may be constructed with predetermined settings suggesting the rate and temperature to be used when a specific material and thickness is selected.

While various embodiments of the disclosed principles have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. An apparatus for welding a thermoplastic profile strip to a thermoplastic membrane, the apparatus comprising:
    a first nozzle configured to direct hot air above and below a first raised longitudinal lip along a first edge of a horizontal base of a thermoplastic profile strip placed on a thermoplastic membrane;
    a second nozzle configured to direct hot air above and below a second raised longitudinal lip along a second, opposing edge of the thermoplastic profile strip;
    a tubular splitter configured to simultaneously supply hot air to the first nozzle and the second nozzle; and
    a platform,
    a plurality of pressure rollers mounted to the platform and configured to press the first and second raised lips down against the membrane during the hot air applied above and below the first and second raised lips,
    a guiding device mounted to the platform and configured to engage a portion of the thermoplastic profile strip to ensure the apparatus remains connected to the thermoplastic profile strip during operation of the apparatus,
    wherein the guiding device further comprises a locking device to ensure the guiding device remains connected to the thermoplastic profile strip during operation of the apparatus.

2. The apparatus of claim 1, wherein the guiding device further comprises a guiding roller to control the elevation of the platform.

3. The apparatus of claim 1, further comprising a hot air supply to supply hot air to the tubular splitter.

4. An apparatus for welding a thermoplastic profile strip to a thermoplastic membrane, the apparatus comprising:
- a first nozzle configured to direct hot air above and below a first raised longitudinal lip along a first edge of a horizontal base of a thermoplastic profile strip placed on a thermoplastic membrane;
- a second nozzle configured to direct hot air above and below a second raised longitudinal lip along a second, opposing edge of the thermoplastic profile strip;
- a tubular splitter configured to simultaneously supply hot air to the first nozzle and the second nozzle; and
- a guiding device configured to engage a portion of the thermoplastic profile strip to ensure the apparatus remains connected to the thermoplastic profile strip during operation of the apparatus.

5. The apparatus of claim 4, further comprising:
- a platform,
- a plurality of pressure rollers mounted to the platform and configured to press the first and second raised lips down against the membrane during the hot air applied above and below the first and second raised lips; and,
- a guiding device mounted to the platform and configured to engage a portion of the thermoplastic profile strip to ensure the apparatus remains connected to the thermoplastic profile strip during operation of the apparatus.

6. The apparatus of claim 4, wherein the guiding device further comprises a guiding roller to control the elevation of the platform.

7. The apparatus of claim 4, further comprising a hot air supply to supply hot air to the tubular splitter.

* * * * *